(12) United States Patent
Hines et al.

(10) Patent No.: US 9,154,906 B2
(45) Date of Patent: Oct. 6, 2015

(54) AREA WATCHER FOR WIRELESS NETWORK

(75) Inventors: Gordon John Hines, Kirkland, WA (US); Mario G. Tapia, Seattle, WA (US); Will Cousins, Seattle, WA (US)

(73) Assignee: TELECOMMUNICATION SYSTEMS, INC., Annanpolis, MD (US)

( * ) Notice: Subject to any disclaimer, the term of this patent is extended or adjusted under 35 U.S.C. 154(b) by 1376 days.

(21) Appl. No.: 11/360,579

(22) Filed: Feb. 24, 2006

(65) Prior Publication Data

US 2007/0202851 A1    Aug. 30, 2007

Related U.S. Application Data

(62) Division of application No. 10/318,171, filed on Dec. 13, 2002, now Pat. No. 7,321,773.

(60) Provisional application No. 60/367,710, filed on Mar. 28, 2002.

(51) Int. Cl.
    *H04W 24/00* (2009.01)
    *H04W 4/02* (2009.01)
    (Continued)

(52) U.S. Cl.
    CPC ............. *H04W 4/02* (2013.01); *H04W 4/021* (2013.01); *H04W 64/00* (2013.01); *H04L 67/18* (2013.01); *H04W 4/14* (2013.01); *H04W 64/006* (2013.01)

(58) Field of Classification Search
    CPC ........................................................ H04W 4/02
    USPC ................... 455/404.2, 414.1, 414.2, 456.3
    See application file for complete search history.

(56) References Cited

U.S. PATENT DOCUMENTS

| 1,103,073 A | 7/1914 | O'Connell |
| 4,445,118 A | 4/1984 | Taylor et al. |

(Continued)

FOREIGN PATENT DOCUMENTS

| WO | WO9921380 | 4/1999 |
| WO | PCTUS9928848 | 12/1999 |

(Continued)

OTHER PUBLICATIONS

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

(Continued)

*Primary Examiner* — Huy C Ho
(74) *Attorney, Agent, or Firm* — Tarolli, Sundheim, Covell & Tummino LLP

(57) ABSTRACT

Dynamic and current information is provided regarding a wireless device's entry into or exit from a geographically defined "watched" area. An area watcher application monitors preconfigured wireless devices entry/exit into preconfigured watched areas. The watched areas may watch for any/all subscribers, or for select, preconfigured subscribers listed in an appropriate table or database. Provision of location information is triggered by a wireless subscriber's entry, exit or changing between designated 'watched' areas or locations. Continuous polling may be used, or the mobile device itself or network element may be triggered to push its own location upon notification of its entry into or out of watched areas from an area watcher. A third party may be notified when a wireless user enters an area surrounding their retail store, and be sent a message such as "sale inside", or "Your rentals are overdue", on their wireless device.

23 Claims, 7 Drawing Sheets

(51) Int. Cl.
*H04W 4/14* (2009.01)
*H04W 64/00* (2009.01)
*H04L 29/08* (2006.01)

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,868,570 A | 9/1989 | Davis |
| 4,891,638 A | 1/1990 | Davis |
| 4,891,650 A | 1/1990 | Sheffer |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,144,283 A | 9/1992 | Arens |
| 5,161,180 A | 11/1992 | Chavous |
| 5,166,972 A | 11/1992 | Smith |
| 5,177,478 A | 1/1993 | Wagal |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | Deluca |
| 5,289,527 A | 2/1994 | Tiedemann, Jr. |
| 5,293,642 A | 3/1994 | Lo |
| 5,299,132 A | 3/1994 | Wortham |
| 5,311,516 A | 5/1994 | Kuznicki |
| 5,325,302 A | 6/1994 | Izidon |
| 5,327,529 A | 7/1994 | Fults |
| 5,334,974 A | 8/1994 | Simms |
| 5,343,493 A | 8/1994 | Karimullah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hoshen |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,398 A | 7/1996 | Hall |
| 5,539,829 A | 7/1996 | Lokhoff |
| 5,543,776 A | 8/1996 | L'Esperance |
| 5,552,772 A | 9/1996 | Janky |
| 5,555,286 A | 9/1996 | Tendler |
| 5,568,119 A | 10/1996 | Schipper |
| 5,574,648 A | 11/1996 | Pilley |
| 5,579,372 A | 11/1996 | Astrom |
| 5,588,009 A | 12/1996 | Will |
| 5,592,535 A | 1/1997 | Klotz |
| 5,604,486 A | 2/1997 | Lauro |
| 5,606,313 A | 2/1997 | Allen |
| 5,606,618 A | 2/1997 | Lokoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,633,912 A | 5/1997 | Tsoi |
| 5,636,276 A | 6/1997 | Brugger |
| 5,661,755 A | 8/1997 | Van De Kerkhof |
| 5,682,600 A | 10/1997 | Salin |
| 5,699,053 A | 12/1997 | Jonsson |
| 5,704,029 A | 12/1997 | Wright, Jr. |
| 5,721,781 A | 2/1998 | Deo |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Guenluek |
| 5,771,353 A | 6/1998 | Eggleston |
| 5,774,533 A | 6/1998 | Patel |
| 5,774,670 A | 6/1998 | Montolli |
| 5,778,304 A * | 7/1998 | Grube et al. ............... 455/456.4 |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,809,415 A | 9/1998 | Rossmann |
| 5,812,087 A | 9/1998 | Krasner |
| 5,822,700 A | 10/1998 | Hult |
| 5,828,740 A | 10/1998 | Khuc |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkan |
| 5,874,914 A | 2/1999 | Krasner |
| 5,896,369 A | 4/1999 | Warsta |
| 5,920,821 A | 7/1999 | Seazholtz |
| 5,922,074 A | 7/1999 | Richard |
| 5,930,250 A | 7/1999 | Klok |
| 5,930,701 A | 7/1999 | Skog |
| 5,943,399 A | 8/1999 | Bannister |
| 5,945,944 A | 8/1999 | Krasner |
| 5,946,629 A | 8/1999 | Sawyer |
| 5,946,630 A | 8/1999 | Willars |
| 5,950,130 A | 9/1999 | Coursey |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Huotari |
| 5,999,124 A | 12/1999 | Sheynblat |
| 6,014,602 A | 1/2000 | Kithil |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe |
| 6,061,018 A | 5/2000 | Sheynblat |

(56) References Cited

U.S. PATENT DOCUMENTS

| | | |
|---|---|---|
| 6,061,346 A | 5/2000 | Nordman |
| 6,064,336 A | 5/2000 | Krasner |
| 6,064,875 A | 5/2000 | Morgan |
| 6,070,067 A | 5/2000 | Nguyen |
| 6,075,982 A | 6/2000 | Donovan |
| 6,081,508 A | 6/2000 | West |
| 6,085,320 A | 7/2000 | Kaliski, Jr. |
| 6,101,378 A | 8/2000 | Barabash |
| 6,104,931 A | 8/2000 | Havinis |
| 6,108,533 A | 8/2000 | Brohoff |
| 6,122,503 A | 9/2000 | Daly |
| 6,122,520 A | 9/2000 | Want |
| 6,124,810 A | 9/2000 | Segal |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,169,891 B1 | 1/2001 | Gorham |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,181,939 B1 | 1/2001 | Ahvenainen |
| 6,185,427 B1 | 2/2001 | Krasner |
| 6,188,354 B1 | 2/2001 | Soliman |
| 6,188,752 B1 | 2/2001 | Lesley |
| 6,188,909 B1 | 2/2001 | Alanara |
| 6,189,098 B1 | 2/2001 | Kaliski, Jr. |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Winbladh |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,744 B1 | 6/2001 | Morita |
| 6,249,873 B1 | 6/2001 | Richard |
| 6,253,074 B1 | 6/2001 | Carlsson |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagaris |
| 6,289,373 B1 | 9/2001 | Dezonno |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,092 B1 | 11/2001 | Fitch |
| 6,321,257 B1 | 11/2001 | Kotola |
| 6,324,542 B1 | 11/2001 | Wright, Jr. |
| 6,327,473 B1 | 12/2001 | Soliman |
| 6,327,479 B1 | 12/2001 | Mikkola |
| 6,330,454 B1 | 12/2001 | Verdonk |
| 6,333,919 B2 | 12/2001 | Gaffney |
| 6,360,093 B1 | 3/2002 | Ross |
| 6,360,102 B1 | 3/2002 | Havinis |
| 6,367,019 B1 | 4/2002 | Ansell |
| 6,370,389 B1 | 4/2002 | Isomursu |
| 6,377,209 B1 | 4/2002 | Krasner |
| 6,377,810 B1 | 4/2002 | Geiger |
| 6,397,208 B1 | 5/2002 | Lee |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,433,734 B1 | 8/2002 | Krasner |
| 6,434,381 B1 | 8/2002 | Moore et al. ............... 455/414.3 |
| 6,449,473 B1 | 9/2002 | Raivisto |
| 6,449,476 B1 | 9/2002 | Hutchison, IV |
| 6,456,852 B2 | 9/2002 | Bar |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko |
| 6,556,832 B1 | 4/2003 | Soliman |
| 6,560,534 B2 | 5/2003 | Abraham |
| 6,564,261 B1 | 5/2003 | Gudjonsson |
| 6,570,530 B2 | 5/2003 | Gaal |
| 6,571,095 B1 | 5/2003 | Koodli |
| 6,574,558 B2 | 6/2003 | Kohli |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,606,495 B1 | 8/2003 | Korpi |
| 6,606,554 B2 | 8/2003 | Edge |
| 6,611,757 B2 | 8/2003 | Brodie |
| 6,618,593 B1 | 9/2003 | Drutman |
| 6,618,670 B1 | 9/2003 | Chansarkar |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,680,694 B1 | 1/2004 | Knockeart |
| 6,680,695 B2 | 1/2004 | Turetzky |
| 6,687,504 B1 | 2/2004 | Raith |
| 6,691,019 B2 | 2/2004 | Seeley |
| 6,694,258 B2 | 2/2004 | Johnson |
| 6,694,351 B1 | 2/2004 | Shaffer |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | van Diggelen |
| 6,704,651 B2 | 3/2004 | van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | van Diggelen |
| 6,738,013 B2 | 5/2004 | Orler |

(56) References Cited

U.S. PATENT DOCUMENTS

| | | | |
|---|---|---|---|
| 6,738,800 | B1 | 5/2004 | Aquilon |
| 6,741,842 | B2 | 5/2004 | Goldberg |
| 6,744,856 | B2 | 6/2004 | Karnik |
| 6,744,858 | B1 | 6/2004 | Ryan |
| 6,745,038 | B2 | 6/2004 | Callaway, Jr. |
| 6,747,596 | B2 | 6/2004 | Orler |
| 6,748,195 | B1 | 6/2004 | Phillips |
| 6,751,464 | B1 | 6/2004 | Burg |
| 6,756,938 | B2 | 6/2004 | Zhao |
| 6,757,544 | B2 | 6/2004 | Rangarajan |
| 6,771,742 | B2 | 8/2004 | McCalmont |
| 6,771,971 | B2 | 8/2004 | Smith |
| 6,772,340 | B1 | 8/2004 | Peinado |
| 6,775,255 | B1 | 8/2004 | Roy |
| 6,775,267 | B1 | 8/2004 | Kung |
| 6,775,534 | B2 | 8/2004 | Lindgren |
| 6,775,655 | B1 | 8/2004 | Peinado |
| 6,775,802 | B2 | 8/2004 | Gaal |
| 6,778,136 | B2 | 8/2004 | Gronemeyer |
| 6,778,885 | B2 | 8/2004 | Agashe |
| 6,781,963 | B2 | 8/2004 | Crockett |
| 6,788,249 | B1 | 9/2004 | Farmer |
| 6,795,444 | B1 | 9/2004 | Vo |
| 6,795,699 | B1 | 9/2004 | McCraw |
| 6,799,049 | B1 | 9/2004 | Zellner |
| 6,799,050 | B1 | 9/2004 | Krasner |
| 6,801,159 | B2 | 10/2004 | Swope |
| 6,807,534 | B1 | 10/2004 | Erickson |
| 6,810,323 | B1 | 10/2004 | Bullock |
| 6,813,264 | B2 | 11/2004 | Vassilovski |
| 6,813,560 | B2 | 11/2004 | van Diggelen |
| 6,816,111 | B2 | 11/2004 | Krasner |
| 6,816,710 | B2 | 11/2004 | Krasner |
| 6,816,719 | B1 | 11/2004 | Heinonen |
| 6,816,734 | B2 | 11/2004 | Wong |
| 6,820,269 | B2 | 11/2004 | Baucke |
| 6,829,475 | B1 | 12/2004 | Lee |
| 6,832,373 | B2 | 12/2004 | O'Neill |
| 6,839,020 | B2 | 1/2005 | Geier |
| 6,839,021 | B2 | 1/2005 | Sheynblat |
| 6,839,417 | B2 | 1/2005 | Weisman |
| 6,842,715 | B1 | 1/2005 | Gaal |
| 6,847,618 | B2 | 1/2005 | Laursen |
| 6,847,822 | B1 | 1/2005 | Dennison et al. .......... 455/456.1 |
| 6,853,916 | B2 | 2/2005 | Fuchs |
| 6,861,980 | B1 | 3/2005 | Rowitch |
| 6,865,171 | B1 | 3/2005 | Nilsson |
| 6,865,395 | B2 | 3/2005 | Riley |
| 6,867,733 | B2 | 3/2005 | Sandhu et al. ............ 455/456.3 |
| 6,867,734 | B2 | 3/2005 | Voor |
| 6,873,854 | B2 | 3/2005 | Crockett |
| 6,876,734 | B1 | 4/2005 | Summers |
| 6,882,850 | B2 | 4/2005 | McConnell et al. |
| 6,885,874 | B2 | 4/2005 | Grube |
| 6,885,940 | B2 | 4/2005 | Brodie |
| 6,888,497 | B2 | 5/2005 | King |
| 6,888,932 | B2 | 5/2005 | Snip |
| 6,895,238 | B2 | 5/2005 | Newell |
| 6,895,249 | B2 | 5/2005 | Gaal |
| 6,898,633 | B1 | 5/2005 | Lyndersay |
| 6,900,758 | B1 | 5/2005 | Mann |
| 6,903,684 | B1 | 6/2005 | Simic |
| 6,904,029 | B2 | 6/2005 | Fors |
| 6,907,224 | B2 | 6/2005 | Younis |
| 6,907,238 | B2 | 6/2005 | Leung |
| 6,912,230 | B1 | 6/2005 | Salkini |
| 6,912,395 | B2 | 6/2005 | Benes |
| 6,912,545 | B1 | 6/2005 | Lundy |
| 6,915,208 | B2 | 7/2005 | Garin |
| 6,917,331 | B2 | 7/2005 | Gronemeyer |
| 6,930,634 | B2 | 8/2005 | Peng |
| 6,937,187 | B2 | 8/2005 | van Diggelen |
| 6,937,872 | B2 | 8/2005 | Krasner |
| 6,940,826 | B1 | 9/2005 | Simard |
| 6,940,950 | B2 | 9/2005 | Dickinson |
| 6,941,144 | B2 | 9/2005 | Stein |
| 6,944,540 | B2 | 9/2005 | King |
| 6,947,772 | B2 | 9/2005 | Minear |
| 6,950,058 | B1 | 9/2005 | Davis |
| 6,957,068 | B2 | 10/2005 | Hutchinson |
| 6,961,562 | B2 | 11/2005 | Ross |
| 6,963,557 | B2 | 11/2005 | Knox |
| 6,965,754 | B2 | 11/2005 | King |
| 6,965,767 | B2 | 11/2005 | Maggenti |
| 6,968,044 | B2 | 11/2005 | Beason |
| 6,970,917 | B1 | 11/2005 | Kushwaha |
| 6,973,320 | B2 | 12/2005 | Brown |
| 6,975,266 | B2 | 12/2005 | Abraham |
| 6,978,453 | B2 | 12/2005 | Rao |
| 6,980,816 | B2 | 12/2005 | Rohles |
| 6,985,747 | B2 | 1/2006 | Chithambaram |
| 6,993,355 | B1 | 1/2006 | Pershan |
| 6,996,720 | B1 | 2/2006 | DeMello |
| 6,999,782 | B2 | 2/2006 | Shaughnessy |
| 7,024,321 | B1 | 4/2006 | Deninger |
| 7,024,393 | B1 | 4/2006 | Peinado |
| 7,047,411 | B1 | 5/2006 | DeMello |
| 7,065,507 | B2 | 6/2006 | Mohammed |
| 7,072,667 | B2 * | 7/2006 | Olrik et al. ................. 455/456.1 |
| 7,079,857 | B2 | 7/2006 | Maggenti |
| 7,103,018 | B1 | 9/2006 | Hansen |
| 7,103,574 | B1 | 9/2006 | Peinado |
| 7,106,717 | B2 | 9/2006 | Rousseau |
| 7,136,466 | B1 | 11/2006 | Gao |
| 7,136,838 | B1 | 11/2006 | Peinado |
| 7,151,946 | B2 | 12/2006 | Maggenti |
| 7,177,397 | B2 | 2/2007 | McCalmont |
| 7,177,398 | B2 | 2/2007 | Meer |
| 7,177,399 | B2 | 2/2007 | Dawson |
| 7,200,380 | B2 | 4/2007 | Havlark |
| 7,209,758 | B1 | 4/2007 | Moll |
| 7,209,969 | B2 | 4/2007 | Lahti |
| 7,218,940 | B2 | 5/2007 | Niemenmaa |
| 7,245,900 | B1 | 7/2007 | Lamb |
| 7,246,187 | B1 | 7/2007 | Ezra |
| 7,260,186 | B2 | 8/2007 | Zhu |
| 7,260,384 | B2 | 8/2007 | Bales et al. |
| 7,269,428 | B1 | 9/2007 | Walenius |
| 7,302,582 | B2 | 11/2007 | Snapp |
| 7,321,773 | B2 | 1/2008 | Hines |
| 7,330,899 | B2 | 2/2008 | Wong |
| 7,333,480 | B1 | 2/2008 | Clarke |
| 7,369,508 | B2 | 5/2008 | Parantainen |
| 7,369,530 | B2 | 5/2008 | Keagy |
| 7,382,773 | B2 | 6/2008 | Schoeneberger |
| 7,392,240 | B2 | 6/2008 | Scriffignano |
| 7,394,896 | B2 | 7/2008 | Norton |
| 7,403,939 | B1 | 7/2008 | Virdy |
| 7,412,049 | B1 | 8/2008 | Koch |
| 7,424,293 | B2 | 9/2008 | Zhu |
| 7,426,380 | B2 | 9/2008 | Hines |
| 7,428,571 | B2 | 9/2008 | Ichimura |
| 7,436,785 | B1 | 10/2008 | McMullen |
| 7,440,442 | B2 | 10/2008 | Grabelsky |
| 7,453,990 | B2 | 11/2008 | Welenson |
| 7,495,608 | B1 | 2/2009 | Chen |
| 7,573,982 | B2 | 8/2009 | Breen |
| 7,602,886 | B1 | 10/2009 | Beech |
| 7,623,447 | B1 | 11/2009 | Faccin |
| 7,711,094 | B1 | 5/2010 | Olshansky |
| 7,747,258 | B2 | 6/2010 | Farmer |
| 7,764,961 | B2 | 7/2010 | Zhu |
| 7,783,297 | B2 | 8/2010 | Ishii |
| 7,787,611 | B1 | 8/2010 | Kotelly |
| 7,792,989 | B2 | 9/2010 | Toebes |
| 7,890,122 | B2 | 2/2011 | Walsh |
| 8,005,683 | B2 | 8/2011 | Tessesl |
| 8,027,658 | B2 | 9/2011 | Suryanarayana |
| RE42,927 | E | 11/2011 | Want |
| 8,060,389 | B2 | 11/2011 | Johnson |
| 8,308,570 | B2 | 11/2012 | Fiedler |
| 2001/0021646 | A1 | 9/2001 | Antonucci |
| 2001/0040886 | A1 | 11/2001 | Jimenez |
| 2002/0037735 | A1 | 3/2002 | Maggenti |

(56) References Cited

U.S. PATENT DOCUMENTS

| | | |
|---|---|---|
| 2002/0052214 A1 | 5/2002 | Maggenti |
| 2002/0061760 A1 | 5/2002 | Maggenti |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1* | 6/2002 | Zellner et al. ............... 455/456 |
| 2002/0077897 A1 | 6/2002 | Zellner |
| 2002/0085538 A1 | 7/2002 | Leung |
| 2002/0086676 A1 | 7/2002 | Hendry |
| 2002/0098832 A1 | 7/2002 | Fleischer |
| 2002/0102996 A1* | 8/2002 | Jenkins ............... 455/456 |
| 2002/0102999 A1 | 8/2002 | Maggenti |
| 2002/0111172 A1 | 8/2002 | DeWolf et al. ........... 455/456 |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0126656 A1 | 9/2002 | Park |
| 2002/0138650 A1 | 9/2002 | Yamamoto |
| 2002/0158777 A1 | 10/2002 | Flick |
| 2002/0161633 A1* | 10/2002 | Jacob et al. ............... 705/14 |
| 2002/0173317 A1 | 11/2002 | Nykanen |
| 2002/0191595 A1 | 12/2002 | Mar |
| 2003/0007886 A1 | 1/2003 | Hwa |
| 2003/0009277 A1 | 1/2003 | Fan |
| 2003/0009602 A1 | 1/2003 | Jacobs |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada |
| 2003/0040272 A1 | 2/2003 | Lelievre |
| 2003/0044654 A1 | 3/2003 | Holt |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0086539 A1 | 5/2003 | McCalmont |
| 2003/0101329 A1 | 5/2003 | Lahti |
| 2003/0103484 A1 | 6/2003 | Oommen |
| 2003/0108176 A1 | 6/2003 | Kung |
| 2003/0109245 A1 | 6/2003 | McCalmont |
| 2003/0118160 A1 | 6/2003 | Holt |
| 2003/0119521 A1* | 6/2003 | Tipnis et al. ........... 455/456 |
| 2003/0119528 A1 | 6/2003 | Pew |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0186709 A1 | 10/2003 | Rhodes |
| 2003/0196105 A1 | 10/2003 | Fineberg |
| 2003/0204640 A1 | 10/2003 | Sahinoja |
| 2003/0223381 A1 | 12/2003 | Schroderos |
| 2004/0002326 A1 | 1/2004 | Maher |
| 2004/0032485 A1 | 2/2004 | Stephens |
| 2004/0043775 A1 | 3/2004 | Kennedy |
| 2004/0044623 A1 | 3/2004 | Wake |
| 2004/0047461 A1 | 3/2004 | Weisman |
| 2004/0068724 A1 | 4/2004 | Gardner |
| 2004/0076277 A1 | 4/2004 | Kuusinen |
| 2004/0098497 A1 | 5/2004 | Banet |
| 2004/0143852 A1 | 7/2004 | Meyers |
| 2004/0181689 A1 | 9/2004 | Kiyoto |
| 2004/0184584 A1 | 9/2004 | McCalmont |
| 2004/0185875 A1 | 9/2004 | Diacakis |
| 2004/0190497 A1 | 9/2004 | Know |
| 2004/0192271 A1 | 9/2004 | Eisner |
| 2004/0198332 A1 | 10/2004 | Lundsgaard |
| 2004/0198386 A1 | 10/2004 | Dupray |
| 2004/0198396 A1 | 10/2004 | Fransioli |
| 2004/0205151 A1 | 10/2004 | Sprigg |
| 2004/0229632 A1 | 11/2004 | Flynn |
| 2004/0232465 A1 | 11/2004 | Shiota |
| 2004/0242238 A1 | 12/2004 | Wang |
| 2004/0267445 A1 | 12/2004 | De Luca |
| 2005/0020242 A1 | 1/2005 | Holland |
| 2005/0028034 A1 | 2/2005 | Gantman |
| 2005/0039178 A1 | 2/2005 | Marolia |
| 2005/0041578 A1 | 2/2005 | Huotari |
| 2005/0043037 A1 | 2/2005 | Loppe |
| 2005/0053209 A1 | 3/2005 | D'Evelyn |
| 2005/0063519 A1 | 3/2005 | James |
| 2005/0074107 A1 | 4/2005 | Renner |
| 2005/0078612 A1 | 4/2005 | Lang |
| 2005/0083911 A1 | 4/2005 | Grabelsky |
| 2005/0086467 A1 | 4/2005 | Asokan |
| 2005/0090236 A1 | 4/2005 | Schwinke |
| 2005/0101335 A1 | 5/2005 | Kelly |
| 2005/0107673 A1 | 5/2005 | Ball |
| 2005/0112030 A1 | 5/2005 | Gaus |
| 2005/0119012 A1 | 6/2005 | Merheb |
| 2005/0125376 A1 | 6/2005 | Curtis |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0169248 A1 | 8/2005 | Truesdale |
| 2005/0174991 A1 | 8/2005 | Keagy |
| 2005/0192822 A1 | 9/2005 | Hartenstein |
| 2005/0201529 A1 | 9/2005 | Nelson |
| 2005/0209995 A1 | 9/2005 | Aksu |
| 2005/0213716 A1 | 9/2005 | Zhu |
| 2005/0232252 A1 | 10/2005 | Hoover |
| 2005/0238156 A1 | 10/2005 | Turner |
| 2005/0255857 A1 | 11/2005 | Kim |
| 2005/0259675 A1 | 11/2005 | Tuohino |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0010200 A1 | 1/2006 | Mousseau |
| 2006/0023747 A1 | 2/2006 | Koren et al. |
| 2006/0026288 A1 | 2/2006 | Acharya |
| 2006/0053225 A1 | 3/2006 | Poikselka |
| 2006/0068753 A1 | 3/2006 | Karpen |
| 2006/0077911 A1 | 4/2006 | Shaffer |
| 2006/0078094 A1 | 4/2006 | Breen |
| 2006/0079330 A1 | 4/2006 | Dvorak |
| 2006/0088152 A1 | 4/2006 | Green |
| 2006/0120517 A1 | 6/2006 | Moon |
| 2006/0128395 A1 | 6/2006 | Muhonen |
| 2006/0135177 A1 | 6/2006 | Winterbottom |
| 2006/0154710 A1 | 7/2006 | Serafat |
| 2006/0188083 A1 | 8/2006 | Breen |
| 2006/0193447 A1 | 8/2006 | Schwartz |
| 2006/0212558 A1 | 9/2006 | Sahinoja |
| 2006/0212562 A1 | 9/2006 | Koshwaha |
| 2006/0234639 A1 | 10/2006 | Kushwaha |
| 2006/0234698 A1 | 10/2006 | Fok |
| 2006/0239205 A1 | 10/2006 | Warren |
| 2006/0250987 A1 | 11/2006 | White |
| 2006/0258380 A1 | 11/2006 | Liebowitz |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0019614 A1 | 1/2007 | Hoffman |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0041513 A1 | 2/2007 | Gende |
| 2007/0049288 A1 | 3/2007 | Lamprecht |
| 2007/0060097 A1 | 3/2007 | Edge |
| 2007/0081635 A1 | 4/2007 | Croak |
| 2007/0115941 A1 | 5/2007 | Patel |
| 2007/0121601 A1 | 5/2007 | Kikinis |
| 2007/0149213 A1 | 6/2007 | Lamba |
| 2007/0160036 A1 | 7/2007 | Smith |
| 2007/0162228 A1 | 7/2007 | Mitchell |
| 2007/0201623 A1 | 8/2007 | Hines |

(56) References Cited

U.S. PATENT DOCUMENTS

| | | |
|---|---|---|
| 2007/0206568 A1 | 9/2007 | Silver |
| 2007/0206613 A1 | 9/2007 | Silver |
| 2007/0242660 A1 | 10/2007 | Xu |
| 2007/0263610 A1 | 11/2007 | Mitchell |
| 2007/0270164 A1 | 11/2007 | Maier |
| 2008/0037715 A1 | 2/2008 | Prozeniuk |
| 2008/0059304 A1 | 3/2008 | Kimsey |
| 2008/0063153 A1 | 3/2008 | Krinorot |
| 2008/0065775 A1 | 3/2008 | Polk |
| 2008/0117859 A1 | 5/2008 | Shahidi |
| 2008/0146343 A1 | 6/2008 | Sullivan et al. |
| 2008/0186164 A1 | 8/2008 | Emigh |
| 2008/0214202 A1 | 9/2008 | Toomey |
| 2008/0249967 A1 | 10/2008 | Flinn |
| 2009/0323636 A1 | 12/2009 | Dillon |
| 2010/0178973 A1 | 7/2010 | Snoddy et al. |
| 2010/0218664 A1 | 9/2010 | Toledano et al. |
| 2011/0273568 A1 | 11/2011 | Lagassey |
| 2012/0001750 A1 | 1/2012 | Monroe |
| 2012/0189107 A1 | 7/2012 | Dickinson |
| 2013/0072308 A1 | 3/2013 | Peck et al. |
| 2013/0079152 A1 | 3/2013 | Hall |

FOREIGN PATENT DOCUMENTS

| | | |
|---|---|---|
| WO | WO01/45342 | 6/2001 |
| WO | PCTUS0146666 | 11/2001 |
| WO | WO2004/025941 | 3/2004 |
| WO | WO2005/051033 | 6/2005 |
| WO | WO2007027166 | 3/2007 |

OTHER PUBLICATIONS

International Search Report in PCT/US2007/23243 dated Apr. 2, 2008.
Extended European Search Report from EPO in European Appl. No. 06827172.5 dated Dec. 29, 2009.
Yilin Zhao, Efiicient andReliable Data Transmission for Cellular and GPS based Mayday Systems, Nov. 1997, IEEE, IEEE Conference on Intelligent Transporatation System, 1997. ITSC 97, 555-559.
Intrado MSAG Prep for E911 Program and Documentation. Intrado Inc., Longmont, CO. Sep. 14, 2006. Accessed: Nov. 8, 2011. Idaho PSAP Standards Committee. Idaho Emergency Communications Commission,http://idahodispatch.com/index.php?option=com_ documan&task=doc_download&gid=3&Itemid=7.
Location Based Services V2 Roaming Support (non proprietary), 80-V8470-2NP A, dated Jan. 27, 2005, pp. 1-56.
U.S. Appl. No. 09/359,495.
Qualcomm CDMA Technologies, LBS Control Plane/User Plane Overview—80-VD378-1NP B, 2006, pp. 1-36.
Bhalla et al, TELUS. Technology Strategy—LBS Roaming Summit, Sep. 19. 2006.
Alfredo Aguirre, Ilusacell, First and Only Carrier in Mexico with a 3G CDMA Network, 2007.
Mike McMullen, Sprint, LBS Roaming Summit, Sep. 19, 2006.
Andrew Yeow, BCE, LBS Roaming Summit, Sep. 19, 2006, pp. 1-8.
Nars Haran, U.S. Cellular, Packet Data—Roaming and LBS Overview, Nov. 2, 2007, pp. 1-15.
Qualcomm CDMA Technologies, LBS Control Plane Roaming—80-VD377-1NP A, 2006, pp. 1-10.
Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

* cited by examiner

Area Watch triggered by polling User Equipment

When a watched UE enters a defined area,
the location server or UE trigger a message to report the UE location to the Location.

AREA WATCHER FOR WIRELESS NETWORK

The present application is a divisional application of U.S. patent application Ser. No. 10/318,171, entitled "Area Watcher for Wireless Network," filed on Dec. 13, 2002 now U.S. Pat. No. 7,321,773; which claims priority from U.S. Provisional Patent Application No. 60/367,710, entitled "Area Watcher for Wireless Network," filed on Mar. 28, 2002, the entirety of both are expressly incorporated herein by reference.

BACKGROUND OF THE INVENTION

1. Field of the Invention

This invention relates generally to wireless and long distance carriers, Internet service providers (ISPs), and information content delivery services/providers and long distance carriers. More particularly, it relates to location services for the wireless industry.

2. Background of Related Art

The Location Interoperability Forum (LIF), the Wireless Application Protocol (WAP) Forum, and $3^{rd}$ Generation Partnership Project (3GPP) have attempted to define an area trigger via Application Protocol Interfaces (APIs) specific to these groups.

The problem with the above solutions is that they are not well defined or do not implement schemes that would permit functionality to support area watching features such as are provided by the present invention.

SUMMARY OF THE INVENTION

In accordance with the principles of the present invention, a subscriber feature for a wireless system comprises a database associating a particular wireless device with at least one geographic area. An area watcher outputs a trigger message upon the particular wireless device's entry into or exit from the at least one geographic area.

A method of providing a message to a wireless device upon their entry or exit from a pre-defined geographic area in accordance with another aspect of the present invention comprises establishing a watched geographic area. Location information regarding wireless devices is monitored, and an area watch message is triggered upon detection of a particular wireless device's entry into the watched geographic area.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
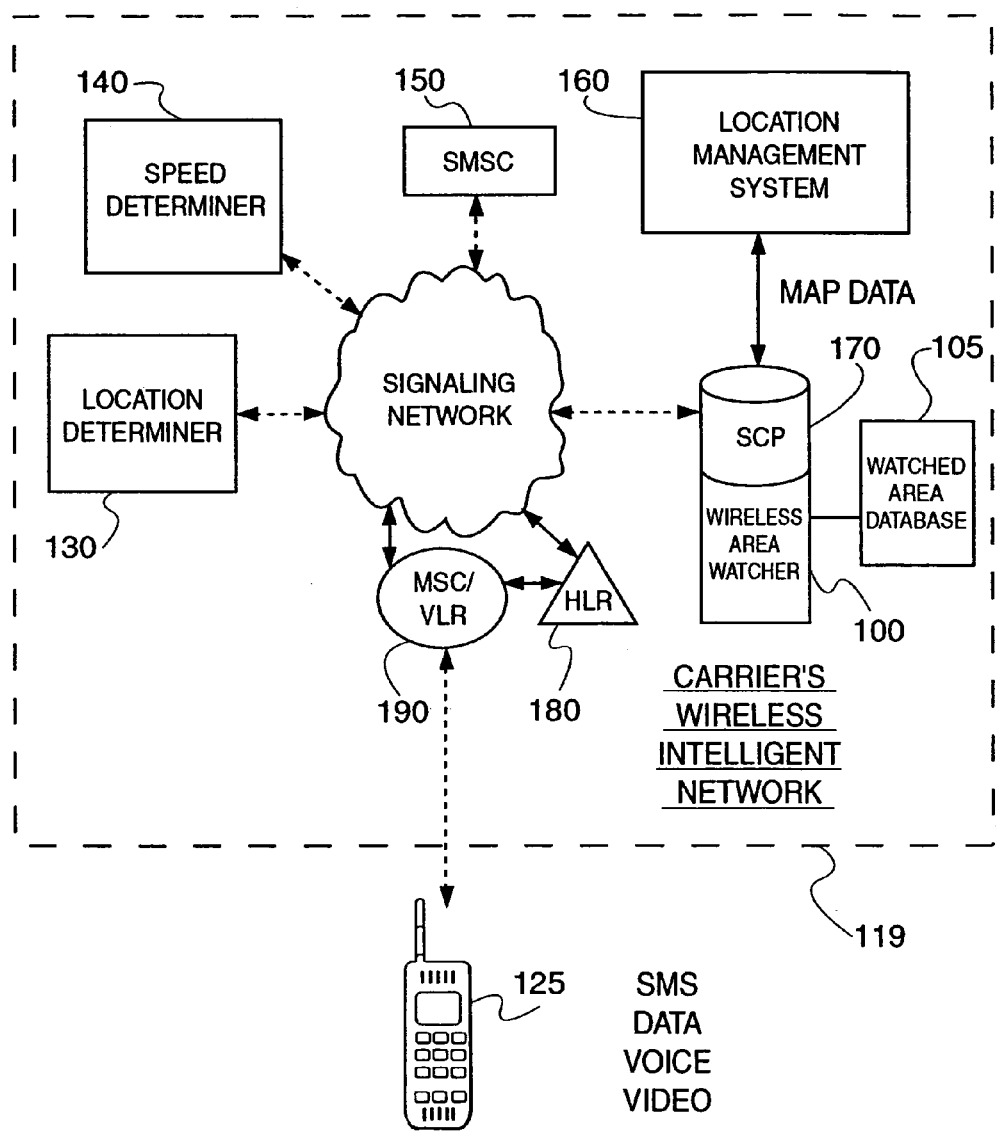
FIG. 1 shows a wireless network tour guide application resident in an SCP of a carrier's wireless intelligent network, in accordance with the principles of the present invention.

The present invention provides an architecture and method in a wireless messaging and/or telephonic system for providing information regarding when a wireless network device (e.g., a wireless phone) enters and/or leaves a geographically defined area that is being "watched" by an area watcher application. The area watcher application commissions and intertwines location based wireless services in a service provider's network with a message system to automatically provide to a requesting third party information regarding a subscriber's dynamic proximity to a watched area.

An area watcher is a monitoring service that delivers mobile device location information triggered by a wireless subscriber's entry, exit or changing between designated 'watched' areas or locations.

Exemplary techniques of watching a designated area or location include, e.g., 1) continuous polling of the mobile device under the direction of an area watcher application program; 2) a software feature in the mobile device itself pushes its location to an area watcher application program; or 3) devices in the radio network determine a location of the mobile device subject to an area watch application, and pushes the location to an element under the direction of the area watch application.

Definitions of the particular 'areas' being watched are important to the successful implementation of an area watcher. In the disclosed embodiments, geographical codes are used to define the various watched area(s), e.g., postal code, principality, state, and/or country. Alternatively, the watched areas may be defined by their relationship to elements of a particular telecommunication network, e.g., within a particular cell site area, within a particular location area (e.g., a group of cell site areas), within a mobile switching center (MSC) area (i.e., within a group of location areas), and within the Public Land Mobile Network (i.e., within a group of MSC Areas).

An updating service may optionally be implemented wherein the watched area(s) for a particular mobile device may be modified.

The area watcher feature may be preconfigured and left ongoing, or may be a polled type request by a third party requesting confirmation of the presence of a particular wireless user in a particular geographic area.

Area watcher services have many uses. For instance, using an area watcher service that notifies a third party when a wireless user enters an area surrounding their retail store. The retailer might then provide a timely short message to the wireless user relating to sales or promotions occurring at the retail store when they are proximate to it. As another example, a video rental store might send a "reminder" message "Your rentals are overdue", on their wireless device as they walk by the store. Services might remind customers of appointments, or even send directions to a particular floor or office in a building when the client comes close to the building. The services might even be just geographic in nature, e.g., special events being held nearby. The possibilities are endless.

The area watch service may allow soliciting by third parties, or it may allow soliciting only once permitted by the wireless user (e.g., to let them know of promotions at a particular store or mall whenever they become proximate to it).

FIG. 1 shows a wireless area watcher application 100 for a wireless network application resident in a service control point (SCP) 170 of a carrier's wireless intelligent network 119, in accordance with the principles of the present invention. While shown resident in an SCP 170, an area watcher application 100 may be resident in any one (or more) suitable element(s) of a wireless carrier's network, in accordance with the principles of the present invention.

As shown in FIG. 1, an SCP 170 of a carrier's wireless intelligent network 119 is adapted to include a wireless area watcher application 100. The wireless area watcher 100 communicates with a location management system 160, a location determiner 130, and a speed determiner 140, all in the wireless carrier's network. The wireless network 119 of the disclosed embodiment further includes a Short Message Service Center (SMSC) 150, Message Servicing Center (MSC) with Visitors Location Register (VLR) 190 and Home Location Register (HLR) 180.

The wireless area watcher 100 in accordance with the principles of the present invention utilizes location information determined by a location determiner 130 to determine a proximate location of a wireless user, and then uses that location information to determine if the wireless user is within an area being watched.

Figure 2:
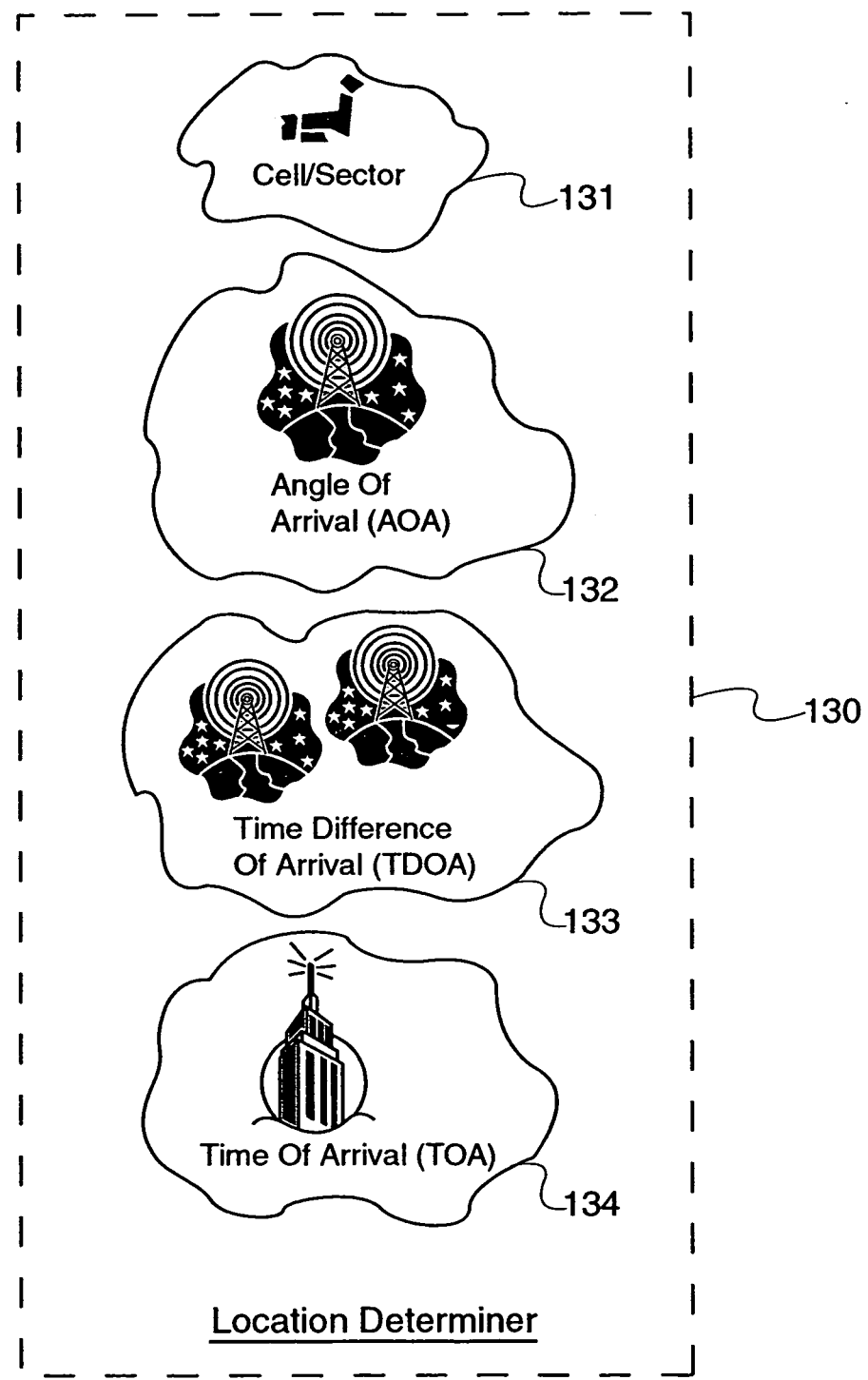
FIG. 2 depicts various embodiments of a location determiner shown in FIG. 1.

FIG. 2 depicts various examples of location determiners 130 shown in FIG. 1 that may be utilized by the present invention.

In particular, as shown in FIG. 2, the location determiner 130 and location management system 160 perform the location management functions of determining subscriber location. Exemplary techniques implemented in the location determiner 130 are call/sector ID 131, angle of arrival (AOA) 132, time difference of arrival (TDOA) 130, time of arrival (TOA) 134, all of which are otherwise known in the art. The present invention is entirely separate from the particular type of location detection used. Any suitable type of location determination may be used in conjunction with an area watcher.

Returning to FIG. 1, location information is determined by the location determiner 130 at the wireless network, though location may alternatively be determined in the wireless device itself (e.g., using a Global Positioning Satellite (GPS) system) and provided to the wireless area watcher 100, which in turn compares the wireless user ID and location information to entries in a watched area database 105.

Speed information may optionally be determined by the location management system of the wireless network 119, to augment the area watcher services. For instance, the slower the speed of the wireless user (e.g., indicating a pedestrian rather than a motorist), perhaps the more likely they are to be affected by information about a promotion occurring therein.

The speed determiner 140 may determine speed of a wireless device (e.g., walking tour, driving tour, flying tour, etc.) inferentially. The speed may be used, e.g., to determine relevance of the proximity of the wireless subscriber. For instance, if a wireless subscriber is passing by a retail store while driving at full speed on an Interstate highway, a message related to the retail store may be more nuisance than benefit.

A location and time history may be maintained by the location management system 160 with respect to particular subscribers being watched by the wireless area watcher 100.

A generalized determination of speed may be sufficient for many applications, e.g., whether the wireless device acts as if it is consistent with a walking subscriber, driving subscriber, biking subscriber, flying subscriber, etc. The wireless subscriber being watched by the wireless area watcher 100 may alternatively be prompted by the wireless area watcher 100 and/or location management system 160 to manually (or audibly) input a particular mode of transportation, generally indicate whether their speed is less than or greater than a given speed, e.g., less than 5 miles/hour (e.g., walking) or more than 5 miles/hour (e.g., biking, driving, etc.) Of course, the wireless subscriber may also be prompted for location information, which may be input manually, though the present invention is focused more on the advantages that an automated implementation of the area watcher provides.

Voice recognition may be implemented in the carrier's wireless network 119 (e.g., accessible to the SCP 170) to simplify a user's input of relevant information, e.g., in navigating through an appropriate user interface menu. For instance, a user can speak the name or other identifying feature of areas that they would like to be "watched" in.

Figure 3:
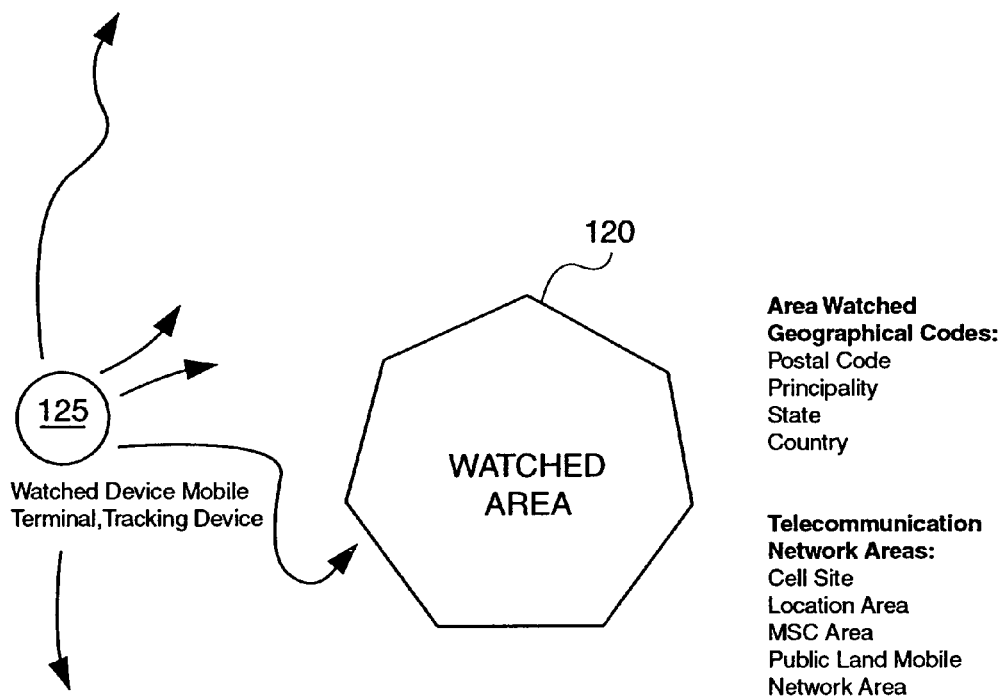
FIG. 3 depicts an established Area Watch and a relevant watched UE/MS device, in accordance with the principles of the present invention.

FIG. 3 depicts an established area watch feature for at least one particular watched UE/MS device, in accordance with the principles of the present invention.

As shown in FIG. 3, a watched area 120 is defined in any suitable and appropriate manner, e.g., by geographical related boundaries, or by telecommunication network defined boundaries. Exemplary geographical related boundaries include, e.g., by street, by postal code, by principality, and even by state or country. Exemplary telecommunication network defined boundaries include, e.g., by cell site, by location area, by mobile switching center (MSC) area, or by public land mobile network area.

The watched area 120 monitors if/when a watched device 125 enters the boundaries of the watched area 120. While the boundaries are ideally accurately defined, specific perimeters may be fuzzy due to the nature of radio communications. Nevertheless, the boundaries will be as accurate as the specific location technology being used. For instance, if the watched device includes a Global Positioning Satellite (GPS) system for location information, the boundaries of the watched area will be extremely accurate. On the other hand, if radio communication type location technology such as angle of arrival and/cell sector is used the exact location of the boundaries of the watched area 120 may be somewhat fuzzier.

Figure 4:
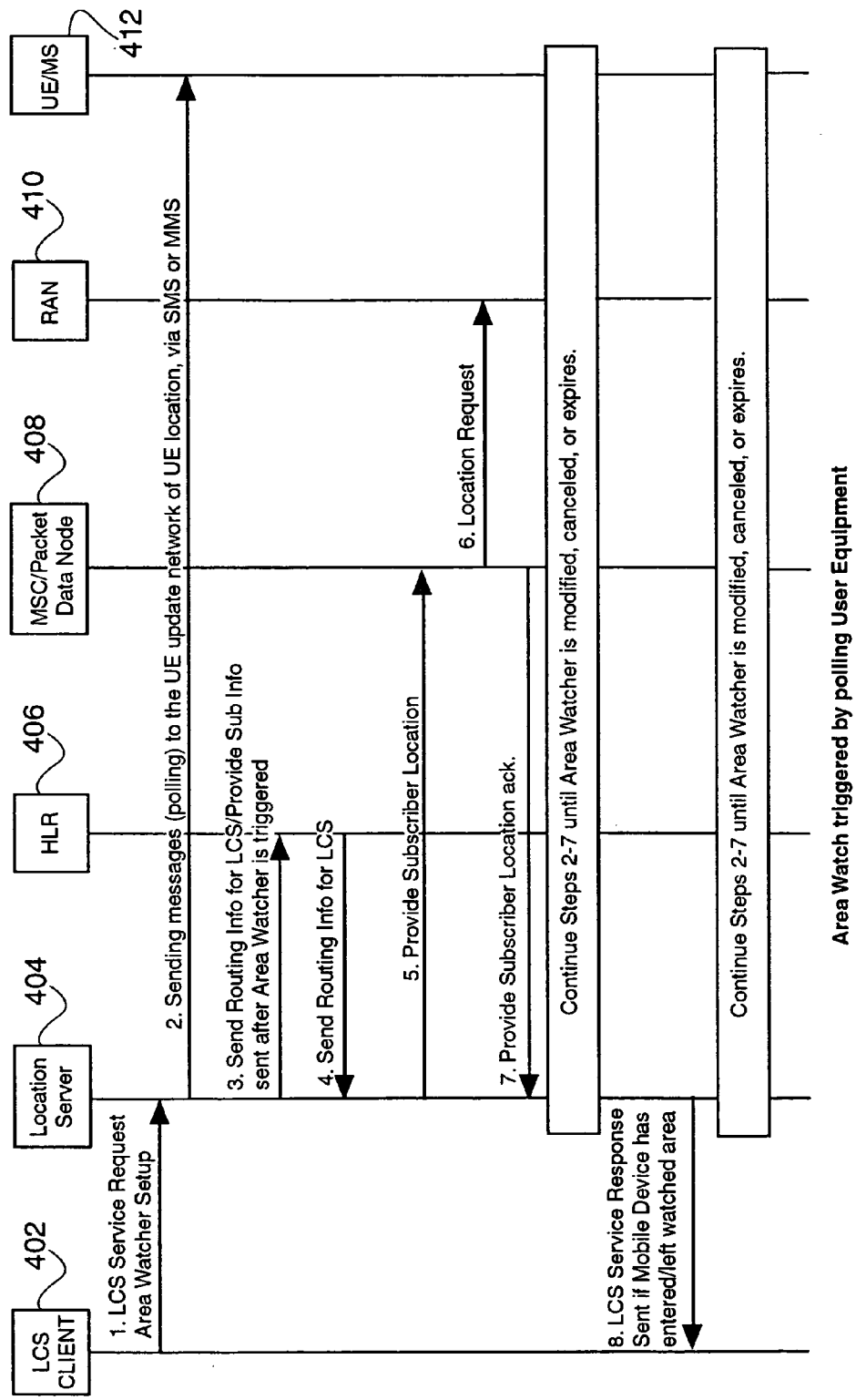
FIG. 4 shows an Area Watch event triggered by polling user equipment, in accordance with one aspect of the present invention.

FIG. 4 shows an Area Watch event triggered by polling user equipment, in accordance with one aspect of the present invention. Elements involved in the events shown in FIG. 4 include a location services client (LCS) client 402, a location server (LS) 404, a home location register (HLR) 406, an MSC/packet data node 408, a radio access network (RAN) 410, and user equipment or mobile subscriber (UE/MS) 412.

The disclosed network elements 402-412 are by way of example only. Of course, other elements in a wireless network may be implemented within the scope of the present invention.

As shown in step 1 of FIG. 4, a location services (LCS) client 402 sends a message and sets up an area to watch to a relevant location server 404.

In step 2, once the area watch feature is setup, messages are sent to the user equipment/mobile subscriber 412 to update the network with current and live location information regarding the mobile subscriber 412, e.g., by MSC location, cell site location, etc.

In step 3, once the location update is made, the location server 404 requests routing information, and location information such as MSC and perhaps cell site information, to the home location register (HLR) 406.

In step 4, the response to the request made in step 3 is sent.

In step 5, location is requested to either the MSC or packet data node 408 for precise location information, e.g., GPS location information, location information provided using triangulation methods, etc.

In step 6, the location request is forwarded to the radio access network (RAN) 410 if needed.

In step 7, a response to the location request is sent to the location server 404.

Steps 2-7 are repeatedly performed in the exemplary embodiment, e.g., at a designated intervals, to monitor for specific mobile subscribers such that the relevant mobile subscriber 412 will be detected upon entering or leaving a particular watched area 120.

In step 8, if the location reported to the location server 404 determines that the mobile subscriber 412 has entered or left a watched area 120, a message is sent to the relevant LCS client 402 (e.g., the LCS client that originally established the area watch feature for that watched area 120, for that mobile subscriber 125, which that mobile subscriber 125 just entered).

Figure 5:
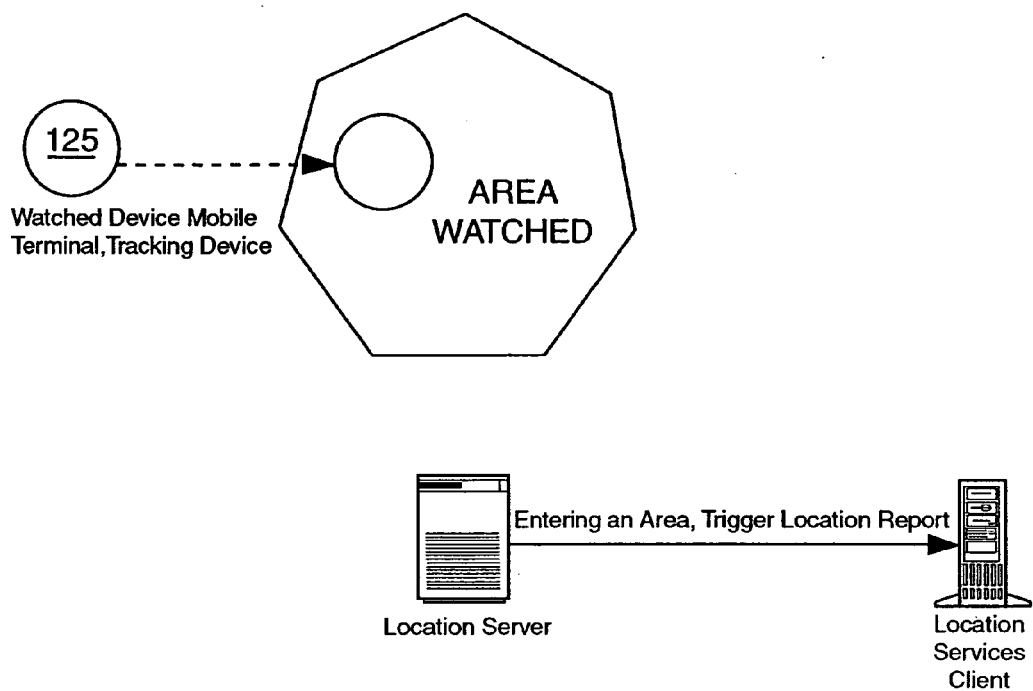
FIG. 5 shows when a watched UE enters a defined area, the location server of UE triggers a message to report the UE location to the Location, in accordance with the principles of the present invention.

FIG. 5 shows when a watched mobile subscriber 125 enters a particular defined watched area 120, the location server 404 of the mobile subscriber 125 triggers a message to report its location, in accordance with the principles of the present invention.

Figure 6:
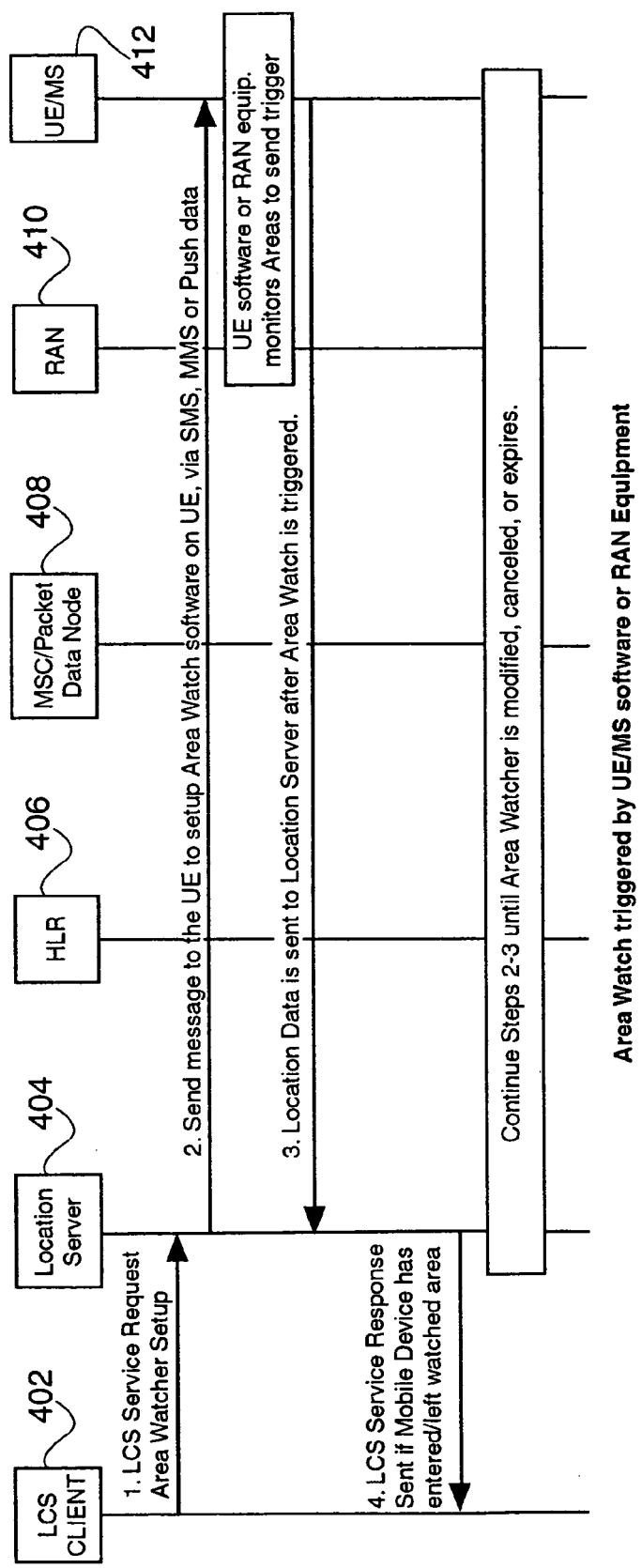
FIG. 6 shows an Area Watch event triggered by UE/MS software or RAN equipment, in accordance with another aspect of the present invention.

FIG. 6 shows a Area Watch triggered by mobile subscriber software or radio access network equipment, in accordance with the principles of the present invention.

In particular, as shown in step 1 of FIG. 6, a location services client 402 sends a message and sets up an area to watch to the location server 404.

In step 2, once the area watch feature is established and set up, messages are sent to the MSC/packet data node 408 or mobile subscriber 125 to establish a watch for that particular subscriber, in that particular watched area 120.

Software on the mobile subscriber 125 or MSC/packet data node 408 monitor the location of the mobile subscriber 125 until the software determines that the mobile subscriber 125 has entered or left the relevant watched area 120.

In step 3, if the area watcher module determines that any watched mobile subscriber 125 has entered or left this (or other) watched area 120, accurate location information regarding that mobile subscriber 125 is sent to the LCS client 402 that set up the area watch feature in the first place.

Then finally, in step 4, the location information regarding the watched mobile subscriber 125 is forwarded to the relevant LCS client 402 (e.g., the LCS client 402 that originally established the watch for that mobile subscriber 125 in that watched area 120).

Figure 7:
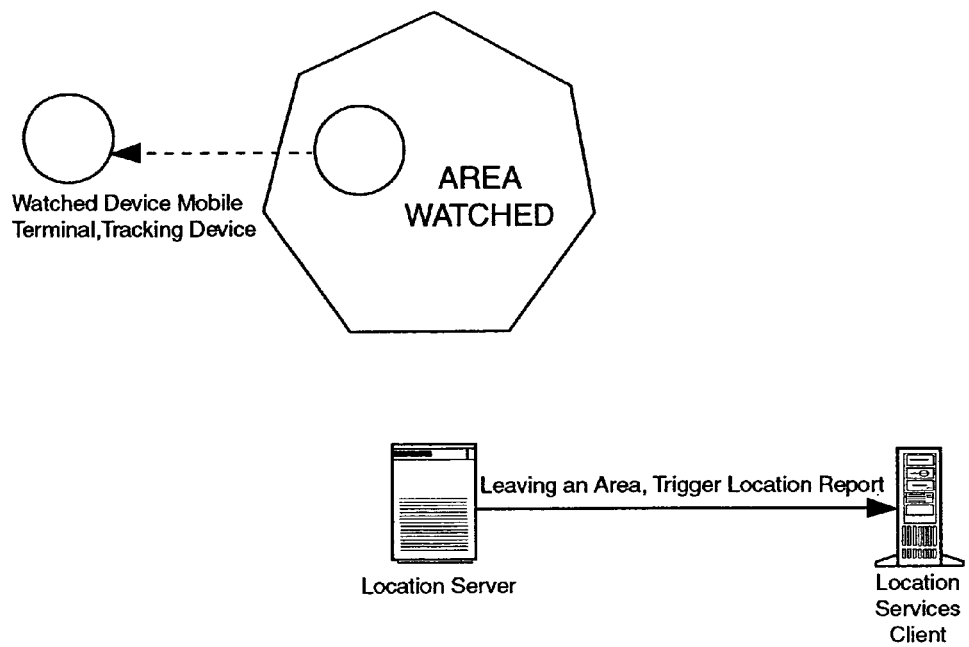
FIG. 7 shows when a watched UE leaves a defined area, the location server or UE triggers a message to report the UE location to the Location, in accordance with the principles of the present invention.

FIG. 7 shows that when a watched mobile subscriber 125 leaves a defined watched area, the location server 404 or mobile subscriber 125 triggers a message to report the location of that mobile subscriber 125 to the location server 404, in accordance with the principles of the present invention.

Thus, in accordance with the principles of the present invention, a watched device 125 may report location periodically, or in response to repeated or periodic triggers (e.g., polling). The location may be reported, triggering a watched area event, as a result of an action performed by the mobile subscriber wireless device 125, or by its entering or leaving a designated watched area 120.

An area watcher in accordance with the principles of the present invention has particular application for use with vendors of location services (e.g., with GMLS and MPC).

An area watcher in accordance with the principles of the present invention may be implemented with any desirable level of privacy protections, including levels that restrict transmission of location information for those particular subscribers that opt-out of the service, or who otherwise desire that their location information not be provided to third parties. For instance, existence in the watched area may be reported without disclosure of the exact location of the particular mobile subscriber 125.

In accordance with the present invention, information may or may not be provided with respect to when the wireless user 125 exits the area being watched 120, depending upon the particular needs of the wireless carrier. Elimination of "exit" messages would reduce network loading. Alternatively, polling or other occasional updates may be implemented to confirm the continued presence of the mobile subscriber 125 in a particular area 120 being watched. Upon the absence of a confirmation message when expected, the wireless user 125 can then be presumed by the requesting third party to have exited the watched area 120.

Moreover, to assure the privacy of wireless users, accurate location information may be blocked from transmission to the requesting third party. If such a feature is desired, only the affirmative "present" type information, or "not present" information may be provided to the requesting third party. This would indicate merely that the mobile subscriber 125 is somewhere in the watched area 120, but does not want to provide the third party with exact location information.

While the invention has been described with reference to the exemplary embodiments thereof, those skilled in the art will be able to make various modifications to the described embodiments of the invention without departing from the true spirit and scope of the invention.

What is claimed is:

1. A subscriber feature for a wireless system to allow a third party to send a text message to a mobile subscriber relative to a geographic area, said system comprising:
   a privacy module configured to allow transmission of presence information relating to a particular wireless device at least one of entering and exiting at least one geographic area relating to a third party, wherein location information characterizing a location of said particular wireless device is blocked from transmission to the third party; and
   a text message transmitter configured to transmit a text message from said third party to said particular wireless device in response to receipt of said presence information relating to said particular wireless device.

2. The subscriber feature for a wireless system according to claim 1, wherein: said geographic area is defined by a zip code.

3. The subscriber feature for a wireless system according to claim 1, wherein: said geographic area is defined by boundaries of the reach of a particular cell site.

4. The subscriber feature for a wireless system according to claim 1,
wherein:
   said geographic area is defined by proximity to a particular retail establishment.

5. The subscriber feature for a wireless system to allow a third party to send a short message to a mobile subscriber relative to a geographic area according to claim 1, further comprising:
   an area watcher configured to a provide a request to activate said text transmitter to output said text message in response to said particular wireless device at least one of entering and
   exiting said at least one geographic area.

6. The subscriber feature for a wireless system to allow a third party to send a short message to a mobile subscriber relative to a geographic area according to claim 1, further comprising:
an area watcher configured to notify a third party that said particular wireless device has at least one of entered and exited said at least one geographic area.

7. The subscriber feature for a wireless system to allow a third party to send a short message to a mobile subscriber relative to a geographic area according to claim 1, wherein:
said privacy module blocks accurate location information of said particular wireless device from being transmitted to said third party.

8. The subscriber feature for a wireless system according to claim 1, wherein said privacy module is further configured to detect execution of a privacy mechanism on said particular wireless device, wherein said privacy mechanism prevents said particular wireless device from transmitting said location information of said particular wireless device.

9. A method of providing a message to a wireless device upon at least one of entering and exiting a pre-defined geographic area, said method comprising:
establishing a watched geographic area;
monitoring location information regarding a given wireless device with respect to said watched geographic area;
transmitting presence information relating to said given wireless device at least one of entering and exiting said watched geographic area to a third party, wherein location information related to said given wireless device is blocked from transmission to the third party; and
triggering a text message from said third party to said given wireless device in response to receipt of said presence information relating said given wireless device.

10. The method of providing a message to a wireless device upon at least one of entering and exiting a pre-defined geographic area according to claim 9, wherein:
said text message relates to unsolicited retail information.

11. The method of providing a message to a wireless device upon at least one of entering and exiting a pre-defined geographic area according to claim 9, further comprising:
associating said given wireless device with said watched geographic area.

12. The method of providing a message to a wireless device upon at least one of entering and exiting a pre-defined geographic area according to claim 9, wherein:
said monitoring comprises polling of location information regarding said given wireless device.

13. The method of providing a message to a wireless device upon at least one of entering and exiting a pre-defined geographic area according to claim 9, wherein:
said monitoring comprises a location push by said given wireless device.

14. The method of providing a message to a wireless device upon at least one of entering and exiting a pre-defined geographic area according to claim 9, wherein:
said monitoring comprises a location push by a wireless carrier network servicing said given wireless device.

15. The method of providing a message to a wireless device upon a pre-defined geographic area according to claim 9, further comprising:
blocking accurate location information of said given wireless device from being transmitted to said third party.

16. The method of providing a message to a wireless device upon at least one of entering and exiting a pre-defined geographic area according to claim 9, further comprising detecting execution of a privacy mechanism on said given wireless device, wherein said privacy mechanism prevents said given wireless device from transmitting said location information related to said particular wireless device.

17. An apparatus for providing a message from a third party to a wireless device upon at least one of entering and exiting a pre-defined geographic area, comprising:
means for establishing a watched geographic area;
means for monitoring location information regarding a given wireless device with respect to said watched geographic area;
means for transmitting presence information relating to said given wireless device at least one of entering and exiting said watched geographic area to a third party, wherein location information of said given wireless device is blocked from transmission to the third party; and
means for triggering a text message from said third party to said given wireless device in response to receipt of said presence information relating to said given wireless device.

18. The apparatus for providing a message to a wireless device upon at least one of entering and exiting a pre-defined geographic area according to claim 17, wherein:
said text message relates to unsolicited retail information.

19. The apparatus for providing a message to a wireless device upon at least one of entering and exiting a pre-defined geographic area according to claim 17, further comprising:
means for associating said given wireless device with said watched geographic area.

20. The apparatus for providing a message to a wireless device upon at least one of entering and exiting a pre-defined geographic area according to claim 17, wherein:
said means for monitoring polls location information regarding said given wireless device.

21. The apparatus for providing a message to a wireless device upon at least one of entering and exiting a pre-defined geographic area according to claim 17, wherein:
said monitoring comprises a location push by said given wireless device.

22. The apparatus for providing a message to a wireless device upon at least one of entering and exiting a pre-defined geographic area according to claim 17, wherein:
said monitoring comprises a location push by a wireless carrier network servicing said given wireless device.

23. The apparatus for providing a message to a wireless device upon at least one of entering and exiting a pre-defined geographic area according to claim 17, further comprising means for detecting execution of a privacy mechanism on said given wireless device, wherein said privacy mechanism prevents said given wireless device from transmitting said location information related to said particular wireless device.

* * * * *